L. R. ALBERGER, DEC'D.
B. D. ALBERGER, S. C. ROSS & A. H. ALBERGER, EXECUTORS.
AUTOMATIC TEMPERATURE CONTROL FOR WATER HEATERS.
APPLICATION FILED JUNE 11, 1909.
1,009,820.
Patented Nov. 28, 1911.
2 SHEETS—SHEET 1.
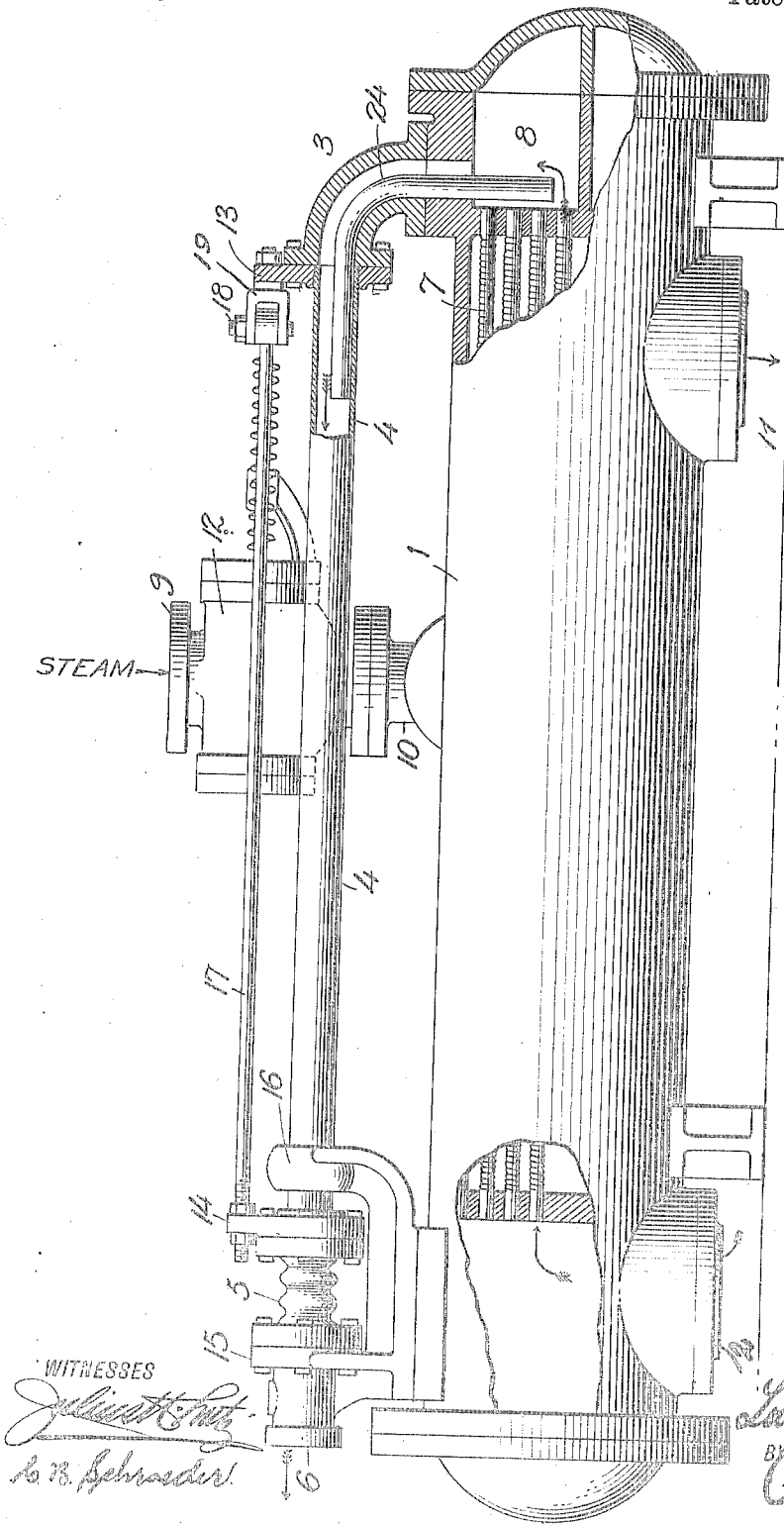

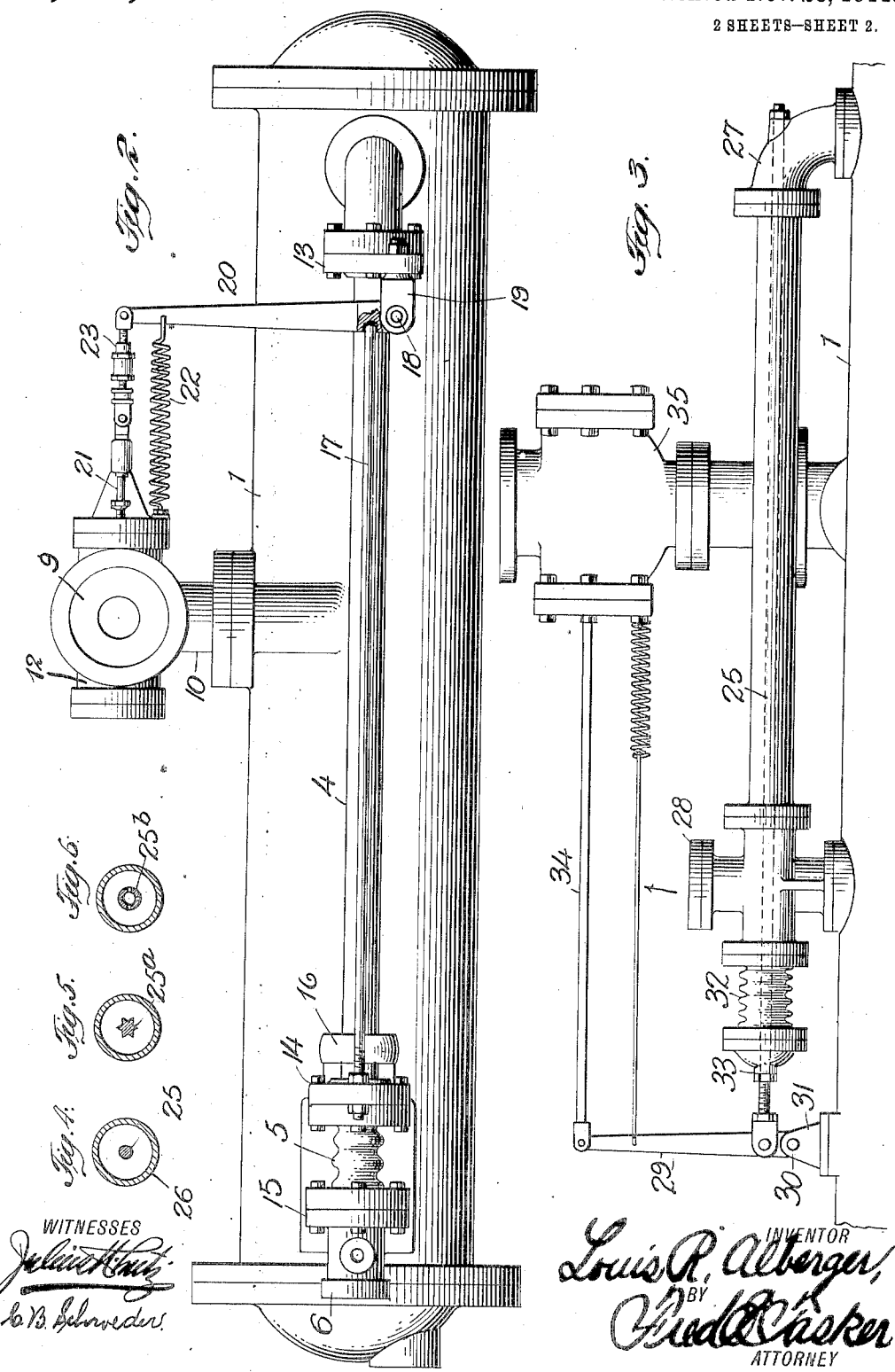

UNITED STATES PATENT OFFICE.

LOUIS R. ALBERGER, OF GREENWICH, CONNECTICUT; BLANCHE DODGE ALBERGER AND SCOTT C. ROSS, OF NEW YORK, N. Y., AND ALVAN H. ALBERGER, OF HAMBURG, NEW YORK, EXECUTORS OF SAID LOUIS R. ALBERGER, DECEASED, ASSIGNORS TO ALBERGER CONDENSER COMPANY, A CORPORATION OF NEW YORK.

AUTOMATIC TEMPERATURE CONTROL FOR WATER-HEATERS.

1,009,820.     Specification of Letters Patent.     Patented Nov. 28, 1911.

Application filed June 11, 1909. Serial No. 501,486.

*To all whom it may concern:*

Be it known that I, LOUIS R. ALBERGER, a citizen of the United States of America, residing at Greenwich, in the county of Fairfield and State of Connecticut, have invented certain new and useful Improvements in Automatic Temperature Control for Water-Heaters, of which the following is a specification, reference being had therein to the accompanying drawing.

My present invention relates to that class of heating apparatus, commonly known as hot water service heaters, in some forms of which the water to be heated flows either through or around tubes or other surfaces which separate it from the steam or other heating agent that supplies the heat. The water may, of course, be heated by actual contact with the steam, but the transmission of the heat is generally through the walls of the tubes or other surfaces. These heaters are finding a very extended use in large office and public buildings, hotels and clubs. On account of the efficiency of the heating surface, resulting in practically instantaneous heating of the water, storage capacity becomes entirely unnecessary. A great saving in space and loss of heat by radiation is thus effected.

One well known form of heater to which my present invention may be applied is the Wainwright heater, which employs corrugated tubes, and may be made either of a horizontal or a vertical pattern.

My present invention comprises means for automatically regulating the supply of the steam so as to control the temperature to which the water may be heated, and maintain this temperature at a more or less constant degree, whatever the amount of water may be which is passing or the pressure of the steam which is being supplied, provided, of course, that the quantities and temperatures are within the scope of the machine.

The invention, therefore, consists essentially in the construction, arrangement and combination of parts substantially as will be hereinafter described and claimed.

In the accompanying drawing, illustrating my invention, Figure 1 is a side elevation in partial section of my improved hot water service heater. Fig. 2 is a top plan view of the same. Fig. 3 is a detail plan view of an alternative form of construction for reaching the same end as that proposed and attained by the other form of the invention. Figs. 4, 5 and 6 are cross-sectional views, showing different forms of the inner solid or tubular rod employed in conjunction with the form of the invention represented in Fig. 3.

Similar characters of reference designate corresponding parts throughout the different figures of the drawing.

Many devices have heretofore been proposed to accomplish my present object, but they have generally been complicated by the use of expensive fluids like alcohol and mercury, minute valves controlling a source of power such as water or air under pressure to operate larger steam admission valves, thermostatic materials which deteriorate with age or use, and manifold other contrivances employing stuffing-boxes between the movable and the rigid parts, all of which various forms require frequent and skilled attention to keep them in proper operative condition, or to make them practicable for serviceable use.

Obviously the chief thing to be accomplished by the present invention is to control the operation of the steam valve so as to admit a greater or less amount of steam, and in my present invention I do this by means of a positive multiplied motion derived from the expansion and contraction of a tube or rod which is in contact with the heated water and which has a movable end, the junction of the movable end of this rod or tube with the rigid portion of the apparatus being by means of a tight but flexible corrugated tube. Also, I employ an interior circulation tube that acts to allow a flow of water to and from the expansion tube or rod and the interior of the heater when no water is being drawn, so that the steam supply will be regulated to suit the temperature of the water inside the heater as well as that in or near the tube or rod.

Other features of value which contribute to the success of the device will be pointed out in the course of the description and claims.

1 denotes the shell of a heater, which, for the sake of illustration and by way of example, I have indicated in a horizontal position. This shell is provided with a cold water inlet at 2, or some other convenient point, for the entrance of the water to be heated, and this water upon its entrance into the shell travels through the same and leaves by way of the elbow 3, expansion tube 4, corrugated tube or expansion joint 5 and outlet 6. The interior of the shell 1 is provided with an arrangement of corrugated tubes 7 through which the water passes between the chambers at the ends of the shell, one of which is shown at 8; and the elbow 3 preferably connects with this chamber 8. The course taken by the water is indicated in Fig. 1 by the feathered arrows and that taken by the steam by unfeathered arrows. There may be various arrangements of nests of tubes and of end chambers in the shell to permit of a circulation of the water through them, and I am not to be restricted to any one or more forms; nor to any particular construction of the tubes, but the tubes into contact with which the steam first comes, as the upper tubes shown in the drawing, will obviously contain the hottest water. Steam is admitted by the inlet 9 and passes through the pipe 10 into the shell 1, where it comes into contact with the tubes through which the water is passing. The steam outlet on the shell 1 is indicated at 11. In connection with the steam inlet 9 a suitable valve at 12 is arranged. The water in the corrugated tubes 7 is heated by the contact of the steam with said tubes, and it then passes through the elbow 3 into the expansion tube 4.

One end of the expansion tube 4, the right-hand end shown in Fig. 1, is rigidly attached to the elbow 3 by means of the flange 13, and this being so it is obvious that the tube 4 in expanding will travel toward the left, carrying with it the flange 14 on its left-hand end, while the corrugated tube 5 acting as an expansion joint absorbs the movement between this moving flange 14 and the rigid fitting 15 which contains the hot water outlet 6. The expansion tube 4 is guided loosely in the bearing 16 on the shell 1. The movement of the flange 14 carries with it a rod 17, whose other end forms the power point of a lever 20 of the third class whose fulcrum is fixed on flange 13 by means of the pivot 18 supported in a socket or bracket 19 affixed rigidly to the flange 13. The end of the rod 17 is properly attached to the said lever 20 very close to its fulcrum 18. The weight point of lever 20 is in contact with the valve stem 21 of steam valve 12; or, in other words, it may be said that the end of the lever 20 is pivotally connected to the outer extremity of the valve rod 21. Said valve rod 21 is provided with suitable nuts 23 by means of which the rod can be shortened or lengthened. Lost motion between the various bearings or points of contact is taken up by means of a spring 22 (see Fig. 2), one end of which is fastened to the lever 20, and the other to some fixed point, as, for instance, the casing of the valve 12. It will be understood that the movement of the flange 14, which movement is due to the expansion of tube 4 by heat as I have already described, reciprocates the valve rod or stem 21 by acting on the rod 17 and the lever 20, with the result that the valve stem is carried in a direction such that the steam valve 12 will be closed to the extent necessary to reduce the flow of steam and prevent a further rise in the temperature of the water above a predetermined point, the length of the valve stem being properly adjusted to the degree required. If now a demand for heated water is made upon the supply, and the supply is sufficiently withdrawn, the slightest drop in the temperature that may be caused thereby with a consequent contraction of the expansion tube, will result in opening the valve so as to supply more hot steam to bring the temperature of the water up to the required figure.

Referring again to Fig. 1, it will be noted that there is a curved or bent circulation pipe 24 located within the elbow 3 and extending downwardly into the chamber 8 at the end of the shell 1, and also extending at the other end into the expansion tube 4. Said circulation pipe 24 is preferably located on the inner curve of the elbow 3 and, in one form in which it may be arranged, extends from near the bottom of the water channel belonging to the uppermost or hottest tubes of the heater to a point some distance within the expansion tube 4, as close to the lower interior side of said expansion tube 4 as possible. It has been found that when the demand upon the hot water heater for water entirely ceases, there will be a slight back flow of cooler water from the supply pipes or mains produced by radiation in these pipes or mains, or in the expansion tube itself, which radiation would tend to open the steam valve and supply heat, although the water in the heater might be thoroughly heated. The function of the circulation pipe 24 is to convey by convection such cooler water to the channel and tubes of the heater, and to supply in its place the hotter water from the heater, so as to keep the expansion tube in full extension and the steam valve closed, or very nearly so. When the water again flows, the pipe 24 forms no obstruction and acts to give free passage to the water, practically at this time forming a part of the elbow 3. It is evident, of course, that this pipe could be made integral with the elbow 3, and equally well serve the purpose in view, or it could be made as an outside pipe leading from one point to the other. The construction given, however, is the more preferable and desirable.

The function of the corrugated tube 5 in taking up the movement of the expansion tube in the expansion and contraction of the latter, will, of course, be fully understood. Said tube forms a flexible connection between the two rigid fittings, consisting of elbow 3 and hot water outlet 6, and allows a free movement of the expansion tube 4. Said corrugated tube 5 is not appreciably affected by change in temperature or pressure; it is perfectly tight against leakage, and it completes in a substantial and workmanlike manner a very practicable, durable and effective combination.

An alternative form of the invention comprises an expansive rod which may be solid, as at 25 in Fig. 4, where it is circular in cross-section, or as at 25$^a$ in Fig. 5 where it is star-shaped in cross section, or may be hollow as at 25$^b$ in Fig. 6 with a number of perforations or other modifications to give surface exposure to the water, or may be of some different design and form. This rod is located inside of a relatively rigid discharge pipe 26, see Fig. 3, which is similar to the expansion tube 4. The discharge pipe 26 connects by an elbow 27 with the heater shell 1 and is also in communication with the water outlet 28. The rod 25 is securely fastened at one end within the elbow 27, while the other end is attached to a lever 29 at a point near the fulcrum 30 of said lever, said fulcrum being upon a projection 31 on the side of the heater shell 1. The end of the discharge pipe 26 beyond the outlet 28 is provided with a corrugated tube section 32 through which the expansion rod also passes and to which the rod is secured at 33 as shown. The movement of the rod is absorbed by the corrugated tube section 32 in the same manner as the movement of the expansion tube in the preferred construction already described. The lever 29 connects with a valve stem 34 belonging to the steam inlet valve 35 which is controlled and operated by the fluctuations of the lever 29 in like manner as is the case with the lever 20 in that form of the combination indicated in Figs. 1 and 2, except that the operation is in an opposite direction. Of course the connection to the multiplying leverage can be made in a great variety of ways, inasmuch as many means for transmitting the smaller movement of the expansion element to the larger motion required to operate the steam valve may be devised.

Many changes in the precise construction, arrangement and combination of the various parts may be made without exceeding the scope of the invention as set forth in the appended claims.

Having thus described my invention, what I claim as new and desire to secure by Letters Patent, is:—

1. The combination with a fluid heater and a valve for admitting the heating agent thereto, of an expansion member, a fluid outlet member, a corrugated tube connected to the free end of the expansion member and also connected to the fluid outlet member, whereby motion due to the expansion and contraction of the expansion member is absorbed, and means whereby the movement of the expansion member is communicated to the valve to control the opening and closing thereof.

2. The combination with a water heater and a valve for admitting steam thereinto, of an expansion tube connected to the heater and through which the hot water is withdrawn, a water outlet member, a corrugated tube connected to the free end of the expansion tube while its other end is secured to the water outlet member, whereby motion due to the expansion and contraction of the expansion tube is absorbed, and means consisting of lever devices for connecting the expansion tube with the valve and controlling the opening of said valve.

3. The combination with a steam valve, of an expansion member, a corrugated tube connected to the free end of said expansion member, so that the movement of the expansion member may be absorbed by the corrugated tube, and means whereby this movement may be communicated to the valve to control the opening of said valve.

4. A heater consisting in the combination of a shell, heating surfaces therein, and means for introducing steam including a valve, an expansion tube connected to the heater and through which the hot water is withdrawn, a water outlet member, a corrugated tube connected to the free end of the expansion tube while the other end is secured to the water outlet member, whereby motion due to the expansion and contraction of the expansion tube is absorbed, and means for communicating said motion to the valve to open and close the same.

5. A water heater comprising the combination of a shell, means for introducing steam including a valve, a discharge pipe connected to said shell, a water outlet member, a corrugated tube connected to the free end of the discharge member while the other end is secured to the water outlet member, whereby motion due to the expansion and contraction of the discharge member is absorbed, and means for multiplying said motion and utilizing it to control the opening and closing of the valve.

6. In a hot water heater, the combination of a shell, means for introducing steam to heat the water, an expansion member, a water outlet member, a corrugated member connected to the expansion member and also to the water outlet member, means for connecting the corrugated member to the valve, and a passage appurtenant to the expansion member to permit an internal circulation of the water in case of inequality of temperature when the flow of water is stopped.

7. In a hot water heater, the combination of a shell, water tubes therein, a valve for admitting steam to heat the tubes, an expansion tube through which water passes from the heater, a corrugated tube arranged in connection with said expansion tube to absorb the motion thereof, means whereby said motion is communicated to the valve to control its opening and closing, and a secondary passage localized relatively to the expansion tube to permit a free local or internal circulation of the water between the interior of the heater and the expansion tube at certain times.

8. In a hot water heater, the combination of a shell, heating surfaces therein through which the water passes, means for introducing steam to heat the water, a discharge pipe, a water outlet pipe, a corrugated tube connected to the free end of the discharge pipe and also to the water outlet pipe, means whereby the motion of the corrugated tube is communicated to the valve to control its opening and closing, and a passage auxiliary to the discharge pipe to permit an internal circulation of the water.

9. In a hot water heater, the combination of a shell, water tubes therein, a valve for admitting steam to heat the tubes, an expansion tube, a corrugated tube connected to the free end of the expansion tube whereby motion due to the expansion and contraction of the expansion tube is absorbed, and means consisting of lever devices whereby said motion is communicated to the valve.

10. The combination in a hot water heater, of a shell, a valve for introducing steam, a discharge pipe, means for connecting said pipe to the valve, a corrugated tube connected to the free end of the discharge pipe to absorb motion due to the expansion and contraction of the discharge pipe, and a passage proximate to said discharge pipe to permit an internal circulation of the water in case of inequality of temperature when the flow of water is stopped.

11. In a hot water heater, the combination of a shell, water tubes therein, a valve for admitting steam to heat the tubes, an expansion member, a water outlet member, a corrugated tube connected to the free end of the expansion member and having its other end secured to the water outlet member, whereby motion due to the expansion and contraction of the expansion member is absorbed, and means whereby the movement of the expansion member is communicated to the valve to open and close the same.

12. In a hot water heater, the combination of a shell, a discharge pipe connecting therewith, a water outlet pipe, a corrugated tube connected to the free end of the discharge pipe while its other end is secured to the water outlet pipe, means for communicating the movement of the discharge pipe to the valve, and a passage appurtenant to said discharge pipe to permit an internal circulation of water under certain conditions.

In testimony whereof I affix my signature in presence of two witnesses.

LOUIS R. ALBERGER.

Witnesses:
C. B. SCHROEDER,
R. G. Du Bois.